April 3, 1951     A. H. PETERS     2,547,772
TRACTOR HITCH
Filed Jan. 11, 1949     2 Sheets-Sheet 1
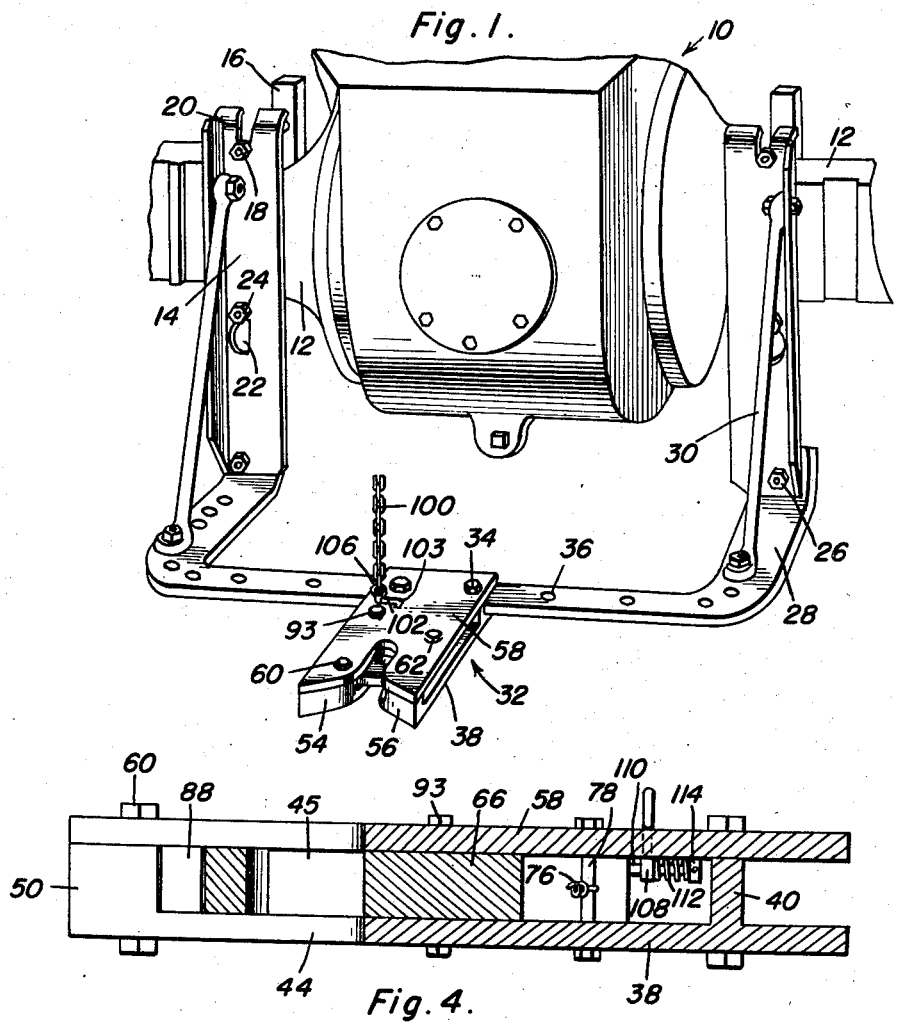
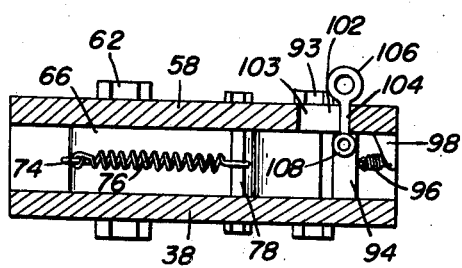
Adolph H. Peters
INVENTOR.

April 3, 1951  A. H. PETERS  2,547,772
TRACTOR HITCH

Filed Jan. 11, 1949  2 Sheets—Sheet 2

Adolph H. Peters
INVENTOR.

BY *Clarence A. O'Brien*
*and Harvey B. Jacobson*
Attorneys

Patented Apr. 3, 1951

2,547,772

UNITED STATES PATENT OFFICE 2,547,772

TRACTOR HITCH

Adolph H. Peters, Columbus, Nebr.

Application January 11, 1949, Serial No. 70,298

5 Claims. (Cl. 280—33.15)

This invention comprises novel and useful improvements in a tractor hitch and more specifically pertains to an improved coupling device adapted to be mounted upon the drawbar of a tractor for securing draft implements thereto.

The principal object of this invention is to provide an improved tractor hitch or coupling device which shall be of compact, simple, inexpensive and yet sturdy construction, and which may be readily applied to the drawbar of a tractor and may be conveniently manipulated with a minimum of labor on the part of the tractor operator from the seat of the tractor for coupling and uncoupling implements thereto.

An important object of the invention is to provide a tractor hitch or coupling device which shall have an improved latching mechanism for coupling a member to the hitch with ease and certainty, and yet which may be readily released as desired.

A further object of the invention is to provide an improved tractor hitch wherein the latch member thereof may be resiliently urged to its unlatched position together with a latch locking lever for retaining the latch in its closed or latched position.

Yet another object of the invention is to provide a tractor coupling or hitch wherein there is provided means for guiding a coupling member into latching position in the hitch, and wherein the coupling member may be automatically secured therein by the latch, together with improved means for retaining the latch in its latching position.

These, together with various ancillary features and objects of the invention which will later become apparent as the following description proceeds, are attained by this device, a preferred embodiment of which has been illustrated by way of example only in the accompanying drawings, wherein:

Figure 1 is a perspective view of a portion of the rear of a tractor showing the manner of applying the tractor hitch forming the subject of this invention to the drawbar of the tractor;

Figure 4 is a vertical central longitudinal sectional view taken substantially upon the plane of the section line 4—4 of Figure 2 and showing certain details of construction of the latch housing and its associated mechanism;

Figure 5 is a vertical transverse sectional detail view taken substantially upon the plane of the section line 5—5 of Figure 2 and showing certain structural details within the hitch housing.

Figure 2:
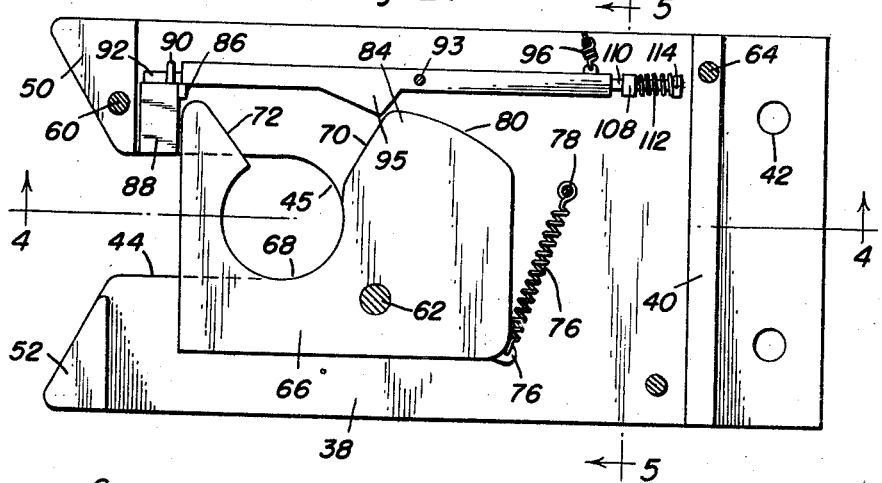
Figure 2 is a horizontal sectional view through the tractor hitch, showing the lower housing member, the latch member pivoted thereto, and the latch lever all in operative position for locking the latch in its closed position.

Referring now more specifically to the accompanying drawings wherein like numerals designate similar parts throughout the various views, attention is directed first to Figure 1 wherein the numeral 10 designates the portion of the rear end of a tractor which may be of any conventional design, and which is provided with rear axle housings 12.

Detachably secured to these rear axle housings is a tractor drawbar construction which may be of any suitable type and, as illustrated, may conveniently comprise a pair of vertically disposed angle iron members 14 which are secured or clamped to the housing as by means of straps or cleats 16 disposed on the opposite side of the housing from the angle iron members, the cleats and angle irons being retained together as by means of fastening bolts and nuts 18 extending therethrough, these bolts being received in elongated slots 20 in one end of the angle iron members.

The angle iron members are further provided with apertures 22 which may be of tapering width to facilitate insertion of fastening bolts 24 therein which serve to clamp the angle iron and the cleats securely to the housing 12.

Secured to the lower ends of the angle iron members 14 as by fastening bolts 26 is a U-shaped, rearwardly extending drawbar member 28 which is disposed in a substantially horizontal plane, suitable reinforcing brace rods 30 being secured to the drawbar member and to the sides of the angle iron members as illustrated.

Supported by the drawbar member 28 and extending horizontally rearwardly therefrom is the tractor hitch, indicated generally by the numeral 32, whose construction constitutes the subject matter of this invention. This hitch is preferably secured as by fastening bolts 34 which extend through suitable spaced apertures 36 in the drawbar, whereby the tractor hitch may be adjusted laterally of the tractor upon the drawbar.

Figure 3:
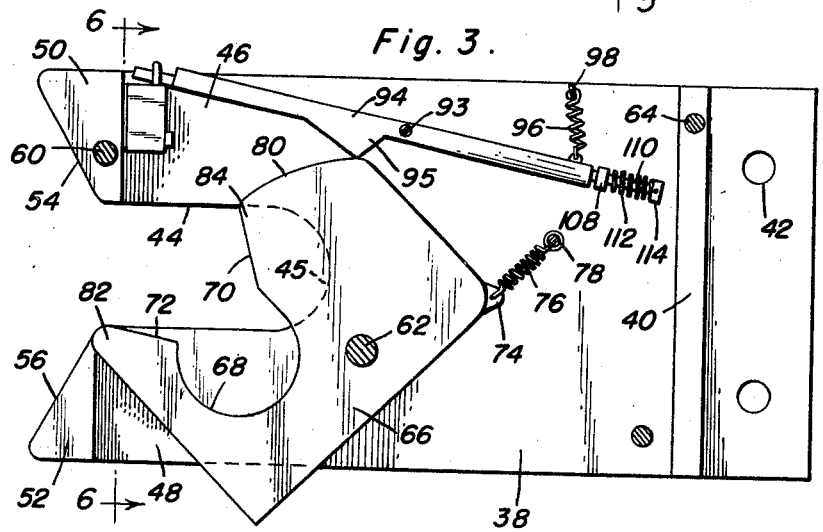
Figure 3 is a view similar to Figure 2 but showing the parts in the latch-released position.
Figure 6:
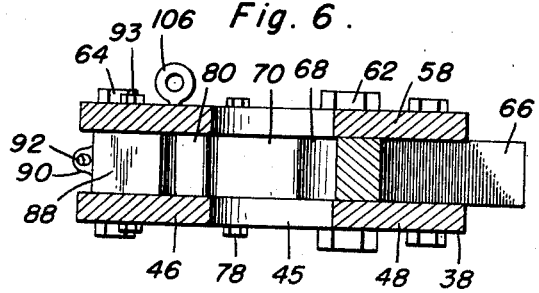
Figure 6 is a vertical transverse sectional detail view taken substantially upon the plane of section line 6—6 of Figure 3 and showing additional features and details of construction of the device.

Referring now more specifically to Figures 2-4, it will be seen that the tractor hitch consists chiefly of flat metallic strips or plates which may be readily shaped and formed in an inexpensive manner. This tractor hitch includes a housing consisting of a base plate 38 which, adjacent its inward extremity, is provided with a transversely extending, upwardly disposed flange 40, this flange being disposed inwardly of the plate from its inner extremity. As will be readily seen from Figures 2 and 3, the plate 38 is further provided with suitable apertures 42 for the reception of the above-mentioned fastening bolts 34 by means of which the housing is secured to the drawbar.

At its outer extremity, the base plate 38 of the housing is medially and longitudinally slotted to provide a notch 44 which is closed at its inner end to provide a semi-circular recess 45, and is open at its outer end. This notch thus bifurcates the outer end of the plate 38, these bifurcations being indicated at 46 and 48.

The outer extremities of these bifurcations have upwardly extending lugs 50 and 52 which are of the same thickness or height as the flange 40, and with that flange serve to support the top or cover plate of the housing as set forth hereinafter. At their outer edges, the bosses 50 and 52 are provided with outwardly diverging guide lips or surfaces 54 and 56 which, at their inner or adjacent ends, merge into the notch 44.

A top or cover plate 58, which is of the same shape as the base plate 38, rests upon the latter and is likewise provided with the longitudinally extending notch having the guide lips which thus are co-terminus with the notch 44 and lips 54 and 56.

Suitable fastening bolts 60 extend through the boss 50 for securing the top and base plates 58 and 38 together, while a similar fastening bolt 64 secures these members and extends through the flange 40.

Also extending through the cover and base plates is a latch fulcrum pin 62 by means of which a latch member 66 is pivotally journaled and mounted in the housing and supported by the base plate and cover plate.

This latch member comprises a metallic plate of substantially rectangular or square shape and has its pivot journaled on the pin 62 disposed inwardly and to one side of the notch 44. This latch plate is provided with a notch which is closed at its inner extremity and contoured to define a circular recess 68, while the outer extremity of the notch is open and has diverging walls 70 and 72 defining cam surfaces. The latch notch is formed in such manner that, as shown in Figure 3, the open end of the latch notch will register with the open end of the housing notch 44 to permit the passage of a coupler member to be retained by the hitch into the notch 44 and by means of the cam surfaces 70 and 72 into the latch recess 68. However, in the closed position of the latch, as shown in Figure 2, the latch notch and the housing notch are disposed transversely to each other, whereby a coupling member will be retained within these notches, as set forth hereinafter.

Disposed upon one corner of the latch plate 66 is a lug 74 to which is attached a latch spring 76 whose other end is fastened, as at 78, to a latch spring retaining pin likewise secured to the cover and base plate. This spring serves to normally urge the latch into its open position as shown in Figure 2.

As shown in Figures 2 and 3, the latch plate 66 is provided adjacent the latch notch with a curved edge 80 forming a cam surface for a purpose which will later become apparent. Upon the other side of the latch notch, the latch plate is provided with a nose 82 forming an abutment member which is adapted to abut the end of the boss 52 to thereby limit the opening movement of the latch plate under the bias of the latch plate spring 76. Between the cam surfaces 70 and 80, the latch plate defines a cam nose 84 for a purpose which will subsequently become apparent.

The inner surface of the boss 50 defines a transversely extending shoulder which constitutes a guide surface, and carried by the portion 46 of the base plate 38 is an upwardly extending lug 86 defining a guide pin which is spaced from this above-mentioned shoulder. Slidably transversely of the portion 46 between the boss 50 and the pin 86 is a block or slide 88 which is thus guided for transverse sliding movement relative to the notch 44 and the base plate 38. This slide is preferably provided with a hook eye 90 for loosely receiving the fingered extremity 92 of a latch lever 94 which is journaled upon a fulcrum pin 93 which may conveniently comprise a bolt or the like extending through the top and base plates of the housing. Extending laterally from this lever 94 is a cam surface 95 which is positioned to engage the cam surface 80 of the latch plate except when the latch is in its closed position as shown in Figure 2, at which time the cam portion 95 will clear the cam nose 84 and be received within the guide or cam surface 70 of the latch notch.

On the opposite side of the fulcrum or pivot pin 93 of the lever 94, from the slide 88, is a latch lever spring 96 which is secured, as at 98, to the base plate 38, this spring urging the lever in a counter-clockwise direction, as viewed in Figures 2 and 3, and thus yieldingly urging the slide 88 into its locking position, and urging the cam portion 95 of the lever either into the latch notch, when the latch is in its closed position or against the latch cam 80 when the latch is in open position, as shown in Figures 2 and 3.

As thus far described, it will be seen that once the latch lever 94 has been released against the bias of its spring 96, the spring 76 will quickly position the latch plate in its open position, as shown in Figure 3. When in this position, the cam 95 of the lever 94 rests upon the cam surface 80 of the latch plate, thereby preventing the spring 96 from returning the latch lever and the slide 88 to their locking position, whereby the parts will be retained in the position shown in Figure 3. The tractor may now be backed until the coupling member, of any suitable type, moves into the housing notch 44 and engages the cam surface 70 of the latch plate. At this time, further backward movement of the tractor will cause the coupling member to press against the cam plate 70, and due to the inclination of the same will rotate the plate 66 in a clockwise direction about its pivot pin 62, against the action of the latch opening spring 76, until the coupling member has rotated the latch plate into substantially the position shown in Figure 2. At that time, the coupling member will be retained in a coupling recess which is defined by the complementary circular portions 45 and 68, and the device will now assume the position of Figure 2, at which time the cam surface 80 will ride out from under the cam portion 95 so that the latter is free to move into the latch notch, which it will now do under the action of its spring 96. This movement of the latch lever thus disposes the slide 88 into its closed position, whereby the same blocks outward movement of the abutment portion 82 of the latch plate, so that the latch is now retained or locked into its latched position, as shown in Figure 2.

It will thus be seen that a momentary pivotal jerk in a clockwise direction upon the latch lever 94 will serve to withdraw the locking slide 88 and the cam portion 95 from their locking positions relative to the latch members 82 and 84, whereupon the spring 76 will quickly urge the latch plate to its unlocked position, and as soon as this opening movement has started, the cam surface 89 will prevent the inward movement of the cam portion 95, thereby holding the lever in its latch-releasing position until such time as the latch is again urged to closed position against the opening force of spring 76.

As shown in Figure 1, a chain or cable 100 is provided for actuation of the latch lever 94, this cable extending to a position adjacent the seat of the driver of the tractor, whereby a quick tug can be given to this cable to cause the above-mentioned actuation of the latch to release the same.

As will be best seen from Figures 1 and 5, the upper plate 58 is provided with a transversely disposed slot 102, which, at its inward end, is provided with an outwardly or perpendicularly disposed lateral extension slot 103. A handle 104 in the form of a rod having an eye portion 106 to which the chain or cable 100 is attached extends through this slot and is slidable therein, this handle and rod being secured to a collar 108 which is slidable upon a longitudinal rod-like extension 110 at the inner end of the lever 94. The end of this extension is provided with a fixed collar 114 and a compression spring 112 is disposed between the movable collar 108 and the fixed collar 114 to thereby urge the collar 108 and the handle longitudinally of the lever 94 and its extension 110 so that when the handle reaches the end of the slot 102 and is in registry with the slot 103, the handle will be urged into this slot which constitutes a locking recess for the handle. Obviously, it is merely necessary to give a pull upon the cable 100 to thereby withdraw the handle 104 from the locking recess 103, whereupon the spring 96 will pivot the lever 94, and consequently move the handle 104 to the outer end of the slot 102. The handle thus is permitted to move within the slots 102 and 103 to permit the pivotal movement of the lever to effect its latching and unlatching functions as above set forth.

From the foregoing, the construction and operation of the device will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having disclosed and described the invention, what is claimed as new is as follows:

1. A tractor hitch comprising a housing with a notch, said notch having an open end with divergent guide lips and a closed end forming a recess, a latch pivoted to said housing with a notch having an open end forming divergent cam surfaces and a closed end defining a circular recess, said latch being selectively movable into open position with the open ends of the notches in registry for the passage of a coupling member therethrough and into closed position with the recesses registering to form a locking recess for a coupling member with the notches disposed transverse each other, a latch spring urging said latch into open position, a pivoted latch lever in said housing having stop means directly attached to the end of said latch lever for retaining said latch in closed position, actuating means for said lever and retaining means for positively and unyieldingly maintaining said actuating means and said lever in latch releasing position, said stop means including a slide connected to said lever and guided for rectilinear sliding movement in said housing in a direction transverse said housing notch.

2. A tractor hitch comprising a housing with a notch, said notch having an open end with divergent guide lips and a closed end forming a recess, a latch pivoted to said housing with a notch having an open end forming divergent cam surfaces and a closed end defining a circular recess, said latch being selectively movable into open position with the open ends of the notches in registry for the passage of a coupling member therethrough and into closed position with the recesses registering to form a locking recess for a coupling member with the notches disposed transverse each other, a latch spring urging said latch into open position, a pivoted latch lever in said housing having stop means directly attached to the end of said latch lever for retaining said latch in closed position, actuating means for said lever and retaining means for positively and unyieldingly maintaining said actuating means and said lever in latch releasing position, said stop means including a slide connected to said lever and guided for rectilinear sliding movement in said housing in a direction transverse said housing notch, said housing having a transverse shoulder forming a guide and abutment for one side of said slide throughout its movement and a guide pin on said housing for guidingly engaging the other side of said slide.

3. A tractor hitch comprising a housing with a notch, said notch having an open end with divergent guide lips and a closed end forming a recess, a latch pivoted to said housing with a notch having an open end forming divergent cam surfaces and a closed end defining a circular recess, said latch being selectively movable into open position with the open ends of the notches in registry for the passage of a coupling member therethrough and into closed position with the recesses registering to form a locking recess for a coupling member with the notches disposed transverse each other, a latch spring urging said latch into open position, a pivoted latch lever having stop means associated therewith for retaining said latch in closed position, actuating means for said lever and retaining means for maintaining said actuating means and said lever in latch-releasing position, said actuating means including a handle slidably mounted on said lever, said retaining means including a slot extending transversely in said housing, said handle being movable in said slot, an offset recess in said slot for receiving and retaining said handle.

4. A tractor hitch comprising a housing with a notch, said notch having an open end with divergent guide lips and a closed end forming a recess, a latch pivoted to said housing with a notch having an open end forming divergent cam surfaces and a closed end defining a circular recess, said latch being selectively movable into open position with the open ends of the notches in registry for the passage of a coupling member therethrough and into closed position with the recesses registering to form a locking recess for a coupling member with the notches disposed transverse each other, a latch spring urging said latch into open position, a pivoted latch lever having stop means associated therewith for retaining said latch in closed position, actuating means for said lever and retaining means for maintaining said actuating means and said lever in latch-releasing position, said actuating means including a handle slidably mounted on said lever, said retaining means including a slot extending transversely in said housing, said handle being movable in said slot, an offset recess in said slot for receiving and retaining said handle, a spring urging said handle for movement upon said lever in a direction to cause engagement of said handle in said recess.

5. A tractor hitch comprising a housing with a notch, said notch having an open end with divergent guide lips and a closed end forming a recess, a latch pivoted to said housing with a notch having an open end forming divergent cam surfaces and a closed end defining a circular recess, said latch being selectively movable into open position with the open ends of the notches in registry for the passage of a coupling member therethrough and into closed position with the recesses registering to form a locking recess for a coupling member with the notches disposed transverse each other, a latch spring urging said latch into open position, a pivoted latch lever having stop means associated therewith for retaining said latch in closed position, actuating means for said lever and retaining means for maintaining said actuating means and said lever in latch-releasing position, said actuating means including a handle slidably mounted on said lever, said retaining means including a slot extending transversely in said housing, said handle being movable in said slot, an offset recess in said slot for receiving and retaining said handle, said recess extending longitudinally of said housing.

ADOLPH H. PETERS.

REFERENCES CITED

The following references are of record in the file of this patent:

UNITED STATES PATENTS

| Number | Name | Date |
|---|---|---|
| 644,338 | Slauson | Feb. 27, 1900 |
| 929,046 | Stoa | July 27, 1909 |
| 1,060,441 | Engel | Apr. 29, 1913 |
| 1,437,836 | Ferris | Dec. 5, 1922 |
| 2,014,963 | Coder | Sept. 17, 1935 |

FOREIGN PATENTS

| Number | Country | Date |
|---|---|---|
| 632,969 | France | Jan. 18, 1928 |